C. E. DANIELSON.
TRAP.
APPLICATION FILED MAY 14, 1915.
1,158,185.
Patented Oct. 26, 1915.
2 SHEETS—SHEET 1.
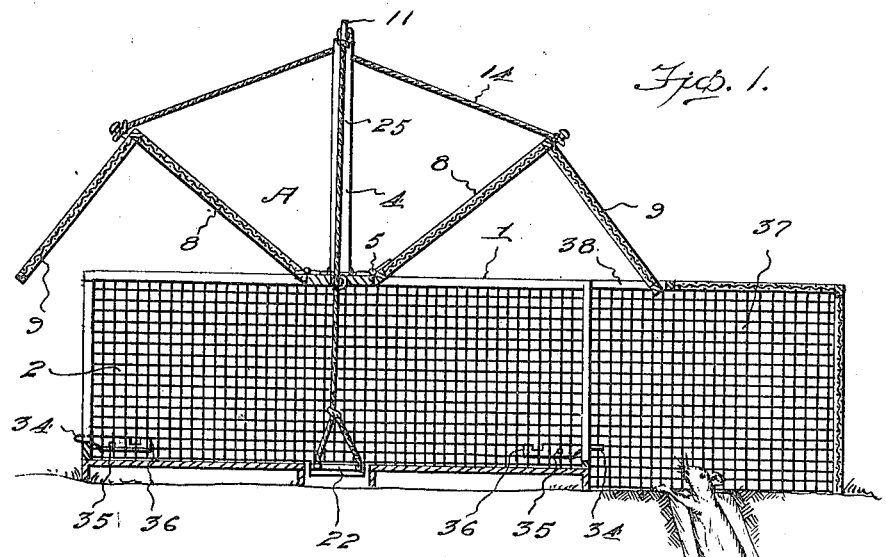
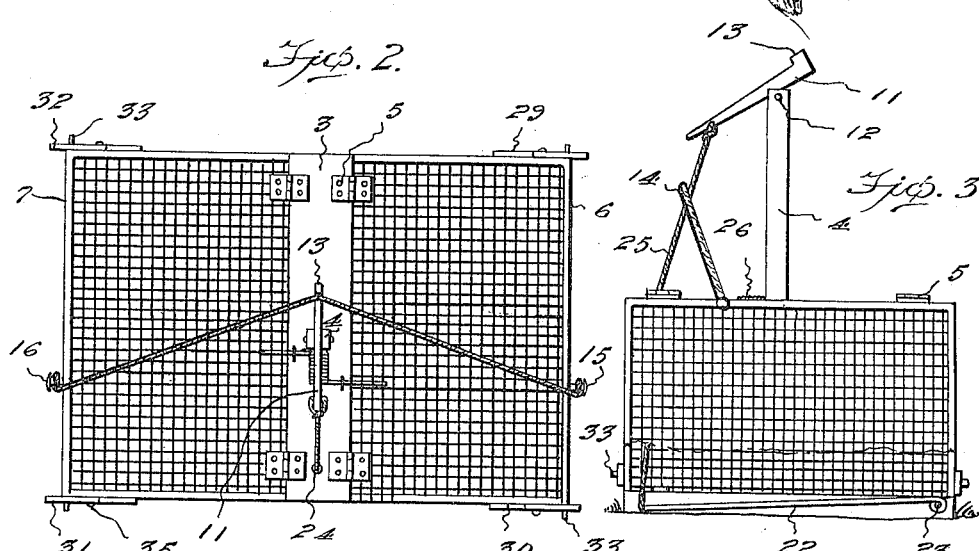
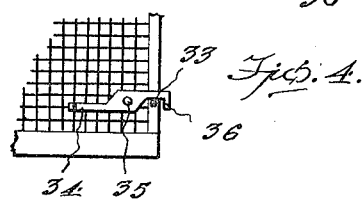
Witnesses
Inventor
C. E. Danielson

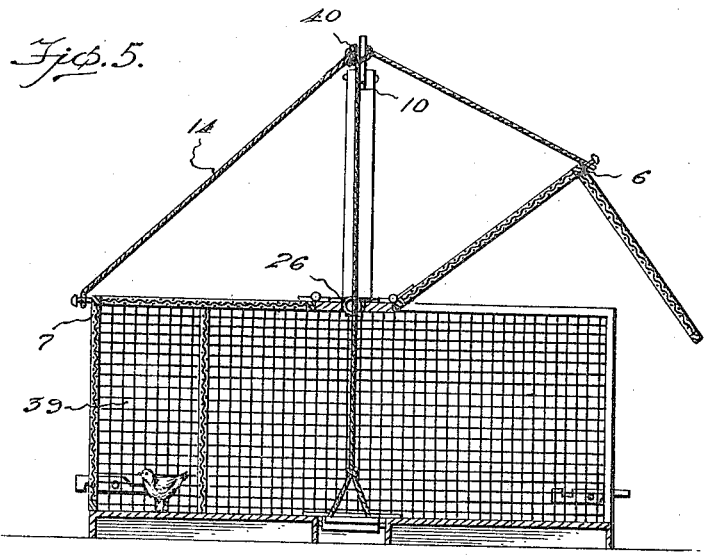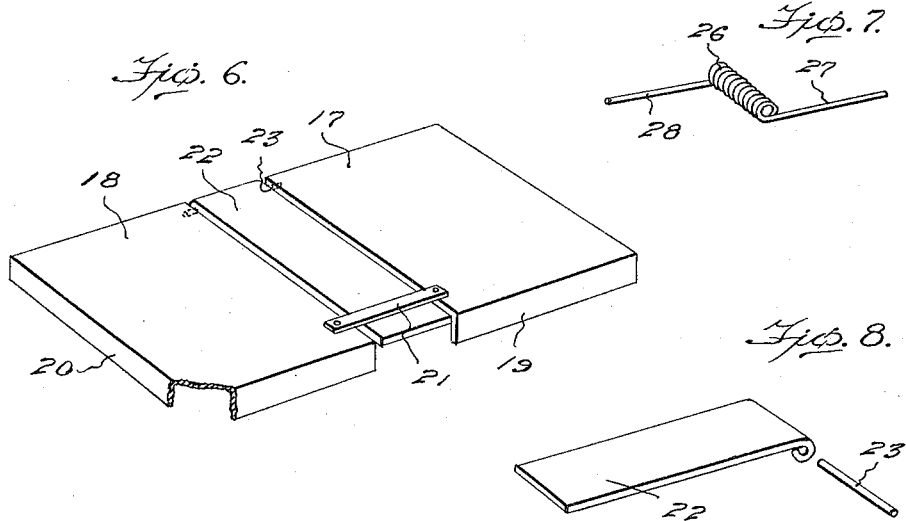

UNITED STATES PATENT OFFICE.

CECIL E. DANIELSON, OF LANGFORD, SOUTH DAKOTA.

TRAP.

1,158,185. Specification of Letters Patent. Patented Oct. 26, 1915.

Application filed May 14, 1915. Serial No. 28,111.

*To all whom it may concern:*

Be it known that I, CECIL E. DANIELSON, a citizen of the United States, residing at Langford, in the county of Marshall and State of South Dakota, have invented certain new and useful Improvements in Traps; and I do hereby declare the following to be a full, clear, and exact description of the invention, such as will enable others skilled in the art to which it appertains to make and use the same.

The general object of this invention is to admit of the regulation of the operating mechanism for a trap door of a cage trap, so that said mechanism can be rendered sensitive to the touch of either large or small animals or can be so regulated that it will be operated only when large animals come in contact therewith; and to this end the invention consists in the provision of a cage having swinging doors thereon, and an upright mounted on the cage and having a lever pivoted to the upper end thereof, a flexible connection between the doors and adapted to be engaged over the latter to hold the doors in an open or operative position, an operating member located within the cage and a connection between the operating mechanism and the lever, whereby to permit the latter to be rocked when the operating mechanism is operated, so as to effect the release of the flexible connection so that the doors may be moved into closed position.

With the above and other objects in view, as will more fully appear from that embodiment of my invention, of which the following is a specification, reference being had to the accompanying drawings, forming a part thereof, in which:

Figure 1 is a sectional elevation of the trap, showing the doors in operative position, Fig. 2 is a top plan view of the trap, Fig. 3 is an end view thereof, Fig. 4 is a detail view, showing the locking mechanism for holding the doors closed when they are moved to closed position, Fig. 5 is a view of a modification, showing the trap provided with an independent bait chamber, Fig. 6 is a perspective view of the floor of the trap removed from the trap, showing the manner of arranging the operating mechanism thereto, Fig. 7 is a perspective view of a spring for retaining the doors to closed position after the mechanism has been operated, Fig. 8 is a perspective view of the operating mechanism removed from the floor of the trap.

Referring to the drawings more in detail, the trap, which is designated by the letter A as an entirety, consists of a skeleton framework 1, which is covered by wire meshed fabric 2. Extending across the top of the framework 1 is a transverse bar 3, and extending upwardly from the bar 3, and positioned at a point midway between the opposite end of the bar 3, is an upright 4. Hingedly connected to the bar 3, as at 5, are a pair of angular doors 6 and 7, which as shown in Fig. 1, consist of a horizontal portion 8 and a depending portion 9. These doors are adapted to swing vertically, as shown in Fig. 1, and when the said doors are in closed position, have their horizontal portions adapted to form a top for the trap, and their depending portions to form closures for the opposite ends of the trap.

The upper end of the upright 4 is provided with a slot 10, and located within said slot is a lever 11, which is pivoted adjacent one end, as at 12, and has the end adjacent said pivot provided with a lateral extension 13.

The doors 6 and 7 are connected to each other by means of a flexible connection 14. the opposite ends of which are connected to bolts 15 and 16 carried by the doors, and arranged at the points of juncture between the horizontal portions and the depending portions, as shown in Fig. 2 of the drawings. This flexible connection 14 is positioned to one side of the upright 4, and is adapted, as shown in Figs. 1 and 2, to engage over the lever 11 when the doors are raised to operative position and to hold the doors in the said operative position. The lever 11 tapers from the end which carries the extension 13, to the opposite end, and the said lever is adapted to assume an oblique position and directly opposite to the position assumed thereby in Fig. 3, when the door is in closed position. Owing to the oblique position assumed by the lever, when the doors are raised or in operative position, the flexible connection 14 will not accidentally become displaced from the lever 11 and will insure of the doors being held in operative position until the operating mechanism is operated.

The bottom of the trap has a floor located therein, which is formed of metallic sections 17 and 18, each of which is provided respectively with depending flanges 19 and 20 which are adapted to form supports for the trap. These sections 17 and 18 are arranged in spaced relation to each other and have connection with each other by means of a rod 21. Located between the sections 17 and 18 is an operating lever 22, which has one end pivoted to the adjacent sections by means of a pivot pin 23, and has its opposite end extending below the rod 21, as is shown in Fig. 6 of the drawings. The operating lever 22 is adapted to have vertical movement between the sections 17 and 18, and the said lever normally has its upper surface lying substantially flush with the upper surfaces of the adjacent sections 17 and 18.

The transverse bar 3 is, provided, adjacent one end, with an aperture 24, through which passes a cord or rope 25, the opposite ends of which are connected respectively to the tapered end of the lever 11 and the free end of the operating lever 22, as is shown in Fig. 1 of the drawings.

From the structure so far described, it will be seen that when an animal steps upon the operating lever 22, the same will be depressed, thereby dropping the lever 11 to the position as shown in Fig. 3 and permitting the flexible connection 14 to become detached from the lever 11, resulting in the descent of the doors 6 and 7. As means for facilitating the closing of the doors when the flexible connection 14 is released from the lever 11, a coil spring 26 is provided. This spring, as shown in Fig. 2, is mounted on the transverse rod 3 and has its opposite end extended laterally in opposite directions and overlying respectively the doors 6 and 7.

Each of the opposite ends of the trap, is provided with a pair of latch bars, the latch bars at one end being designated by the numerals 29 and 30, and the latch bars at the opposite end of the trap being designated by the numerals 31 and 32. Each latch bar has one end provided with a recess 33 and its opposite end provided with an extension or finger 34. When the doors 6 and 7 are raised to open position, the latch bars are rotated upon their pivots 36 and their fingers or extensions positioned within the path of movement of the depending portions 9 of the respective doors 6 and 7, so that upon the descent of the doors, the fingers 34 of the latches will be engaged by the adjacent depending portions 9, which will result in the rotation of the latch bars on their pivots 36, until the recesses 33 receive studs 36 carried by the adjacent depending portions 9 of the doors 6 and 7, thereby locking the doors in closed position.

One end of the trap may be provided, as shown in Fig. 1, with an extension or housing 37, which has its upper or top wall provided with a slot 38 to permit the passage of the depending portion 9 of the adjacent door, and has its lower wall or bottom open and adapted to be positioned over the exit of a burrow, as shown in Fig. 1.

In the modification, shown in Fig. 5, the trap is provided with a bait chamber 39, which is adapted to be closed by the door 7. In this instance, the flexible connection 14, which is to be applied with the type of trap as shown in Fig. 5, will have to be of considerable length so as to provide enough slack to admit of the ropes being engaged over the levers 11 and the door 6 raised to open position without raising the door 7. A knot 40 is formed in the flexible connection 14, and is adapted to engage over one of the longitudinal edges of the levers 11, so as to hold the doors 6 in their raised position.

The sensitiveness of the operating lever 22 can be regulated so that the said lever will be operated only when contacted by large animals, or it may be so regulated that it will be operated by either large or small animals. This regulation of the lever is accomplished by placing the flexible connection, which holds the doors in raised or operative position, at a point near the pivotal connection of the lever 11 with the upright 4, for placing the said flexible connection at a point remote from the pivotal connection, as the case may be.

From the foregoing description it will be seen that I have provided a trap which can be cheaply constructed, effective in operation, and one that can be adjusted to trap either large or small animals or one that can be employed for the catching of large animals exclusively.

Having thus described my invention, what I claim as new is:—

1. A trap comprising, a housing, an upright carried by the housing, a lever pivotally mounted on the upper end of the upright and tapering throughout its length, trapping members associated with the housing, operating means located within the housing, means for connecting the operating means to the smaller end of the lever, a flexible element associated with the trapping members and adapted to detachably engage over the lever for holding the trapping members in operative position, the said flexible element being adapted to be positioned at various points on the lever so as to regulate the sensitiveness of the trapping members.

2. A trap comprising, a rectangular housing, an upright carried by the housing, vertically swinging trap doors for closing the opposite ends of the housing, means connecting the trap doors to each other, means carried by the upright and adapted to engage the means connecting the doors so as to hold the latter in operative position, operating means located within the housing and having connection with the means on the upright for operating the latter so as to effect release of the trap doors so as to permit the latter to move to a closed position, each of the said doors having its vertically disposed edges provided with laterally projecting studs, latch bars rotatably mounted on the sides of the housing adjacent the opposite ends thereof and each having one of its ends formed to provide a finger adapted when the adjacent door is raised to operative position to lie within the path of one of the operating studs carried by the door, so as to be engaged thereby to effect a rotation of the latch bar when the door is moving to closed position, the opposite end of the latch bar being provided with a notch adapted to engage over the adjacent stud when the door is closed, so as to hold the door in a closed position.

In testimony whereof I affix my signature in presence of two witnesses.

CECIL E. DANIELSON.

Witnesses:
 WALTER I. FALK,
 PAULINE E. WALLMAN.

Copies of this patent may be obtained for five cents each, by addressing the "Commissioner of Patents Washington, D. C."